United States Patent [19]

Lee

[11] Patent Number: 5,689,629

[45] Date of Patent: Nov. 18, 1997

[54] ITERATIVE OPTIMIZING QUANTIZATION METHOD FOR RECONSTRUCTING THREE-DIMENSIONAL IMAGES FROM A LIMITED NUMBER OF VIEWS

[75] Inventor: Heung-Rae Lee, Dublin, Calif.

[73] Assignee: The Regents of the University of California, Oakland, Calif.

[21] Appl. No.: 571,330

[22] Filed: Dec. 12, 1995

[51] Int. Cl.$^6$ ............................................. G06F 15/00
[52] U.S. Cl. ............................................. 395/127
[58] Field of Search ............................ 397/127, 119, 397/121, 123, 129, 140; 345/113, 121, 126

[56] References Cited

U.S. PATENT DOCUMENTS 5,586,232  12/1996  Yoshida ........................... 395/127

OTHER PUBLICATIONS

Peter Gilbert, "Iterative Methods for the Three-dimensional Reconstruction of an Object from Projections," J. theor. Bio. (1972) 36, pp. 105–117.

Gabor T. Herman, "ART: Mathematics and Applications. A Report on the Mathematical Foundations and on the Applicability to Real Data of the Algebraic Reconstruction Techniques," J. theor. Bio. (1973) 42, pp. 1–32.

Primary Examiner—Phu K. Nguyen
Attorney, Agent, or Firm—Henry P. Sartorio; Richard B. Main

[57] ABSTRACT

A three-dimensional image reconstruction method comprises treating the object of interest as a group of elements with a size that is determined by the resolution of the projection data, e.g., as determined by the size of each pixel. One of the projections is used as a reference projection. A fictitious object is arbitrarily defined that is constrained by such reference projection. The method modifies the known structure of the fictitious object by comparing and optimizing its four projections to those of the unknown structure of the real object and continues to iterate until the optimization is limited by the residual sum of background noise. The method is composed of several sub-processes that acquire four projections from the real data and the fictitious object: generate an arbitrary distribution to define the fictitious object, optimize the four projections, generate a new distribution for the fictitious object, and enhance the reconstructed image. The sub-process for the acquisition of the four projections from the input real data is simply the function of acquiring the four projections from the data of the transmitted intensity. The transmitted intensity represents the density distribution, that is, the distribution of absorption coefficients through the object.

4 Claims, 4 Drawing Sheets

Fig. 4(a)

unknown real object:

```
0 0 0 0 0 0 0 0 0 0 0 0 0
0 0 0 0 0 0 0 0 0 0 0 0 0
0 0 1 1 1 1 1 1 0 0 0 0 0 0
0 0 1 1 1 1 1 0 0 0 0 0 0
0 0 1 1 1 1 1 0 0 0 0 0 0
0 0 1 1 1 1 1 0 0 0 0 0 0
0 0 0 0 0 0 0 0 0 0 0 0 0
0 0 0 0 0 0 0 0 1 1 0 0 0
0 0 0 0 0 0 0 0 1 1 0 0 0
0 0 0 0 0 0 0 0 1 1 0 0 0
0 0 0 0 0 0 0 0 0 0 0 0 0
0 0 0 0 0 0 0 0 0 0 0 0 0
0 0 0 0 0 0 0 0 0 0 0 0 0
``` known arbutrary unit:

```
0 0 0 0 0 0 0 0 0 0 0 0 0
0 0 0 0 0 0 0 0 0 0 0 0 0
1 1 1 1 1 0 0 0 0 0 0 0 0
1 1 1 1 1 0 0 0 0 0 0 0 0         known
1 1 1 1 1 0 0 0 0 0 0 0 0         arbitrary
1 1 1 1 1 0 0 0 0 0 0 0 0         object
0 0 0 0 0 0 0 0 0 0 0 0 0
1 1 0 0 0 0 0 0 0 0 0 0 0
1 1 0 0 0 0 0 0 0 0 0 0 0
1 1 0 0 0 0 0 0 0 0 0 0 0
0 0 0 0 0 0 0 0 0 0 0 0 0
0 0 0 0 0 0 0 0 0 0 0 0 0
0 0 0 0 0 0 0 0 0 0 0 0 0

0 0 0 0 0 0 0 0 0 0 0 0 0
0 0 0 0 0 0 0 0 0 0 0 0 0
0 1 1 1 1 1 0 0 0 0 0 0 0
0 0 1 1 1 1 0 1 0 0 0 0 0
0 0 1 1 1 0 1 1 0 0 0 0 0         first loop
0 0 1 1 1 1 1 0 0 0 0 0 0
0 0 0 0 0 0 0 0 0 0 0 0 0
0 0 0 0 0 0 0 0 1 1 0 0 0
0 0 0 0 0 0 0 0 1 1 0 0 0
0 0 0 0 0 0 1 0 0 1 0 0 0
0 0 0 0 0 0 0 0 0 0 0 0 0
0 0 0 0 0 0 0 0 0 0 0 0 0
0 0 0 0 0 0 0 0 0 0 0 0 0

0 0 0 0 0 0 0 0 0 0 0 0 0
0 0 0 0 0 0 0 0 0 0 0 0 0
0 0 1 1 1 1 1 0 0 0 0 0 0
0 0 1 1 1 2 0 0 0 0 0 0 0
0 0 1 1 1 1 1 0 0 0 0 0 0         second loop
0 0 1 1 1 1 1 0 0 0 0 0 0
0 0 0 0 0 0 0 0 0 0 0 0 0
0 0 0 0 0 0 0 0 1 1 0 0 0
0 0 0 0 0 0 0 0 1 1 0 0 0
0 0 0 0 0 0 1 0 0 1 0 0 0
0 0 0 0 0 0 0 0 0 0 0 0 0
0 0 0 0 0 0 0 0 0 0 0 0 0
0 0 0 0 0 0 0 0 0 0 0 0 0

0 0 0 0 0 0 0 0 0 0 0 0 0
0 0 0 0 0 0 0 0 0 0 0 0 0
0 0 1 1 1 1 1 0 0 0 0 0 0
0 0 1 1 1 1 1 0 0 0 0 0 0         third loop
0 0 1 1 1 1 1 0 0 0 0 0 0
0 0 1 1 1 1 1 0 0 0 0 0 0
0 0 0 0 0 0 0 0 0 0 0 0 0
0 0 0 0 0 0 0 0 1 1 0 0 0
0 0 0 0 0 0 0 0 1 1 0 0 0
0 0 0 0 0 0 0 0 1 1 0 0 0
0 0 0 0 0 0 0 0 0 0 0 0 0
0 0 0 0 0 0 0 0 0 0 0 0 0
0 0 0 0 0 0 0 0 0 0 0 0 0
```

ITERATIVE OPTIMIZING QUANTIZATION METHOD FOR RECONSTRUCTING THREE-DIMENSIONAL IMAGES FROM A LIMITED NUMBER OF VIEWS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to tomography and more particularly to reconstructing three-dimensional images from a limited number of two-dimensional projections.

2. Description of Related Art

Three-dimensional objects that lie buried away from direct viewing inside a body can often be scanned just outside the body from a two-dimensional plane. Such viewpoints are usually limited in their number by practical considerations. But in general, the more different two-dimensional views that are available, the better the image reconstruction can be of the buried three-dimensional object.

Various methods have been devised to solve the inverse problem for reconstruction with a limited number of views. For example see, R. Gordon, R. Bender and G. T. Herman, "Algebraic reconstruction techniques (ART) for three-dimensional electron microscopy and x-ray photography," J. Theor. Biol. 29, 471–481, 1970; P. Gilbert, "Iterative methods for the three-dimensional reconstruction of an object from projections," J. Theor. Biol., vol. 72, pp. 105–117, 1972; A. V. Lakshminarayanan and A. Lent, "Methods of least squares and SIRT in reconstruction," J. Theor. Biol., vol. 76, pp. 267–295, 1979; G. T. Herman, A. Lent, and S. W. Rowland, "ART: Mathematics and applications. A report on the mathematical foundations and on the applicability to real data of the algebraic reconstruction techniques," J. Theor. Biol. vol. 42, pp. 1–32, 1973; R. Gordon and G. T. Herman, "Reconstruction of pictures from their projections," Comm. A.C.M. vol. 14, pp. 759–768, 1971; H. P. Weiss and J. A. Stein, "The effect of interpolation in CT image reconstruction," Proc. IEEE Comput. Soc. Conf. Pattern Recognition Image Processing Chicago, Ill., p. 193, 1978; G. T. Herman, S. W. Rowland, and M. M. Yau, "A comparative study of the use of linear and modified cubic spline interpolation for image reconstruction," IEEE Trans. Nucl. Sci. NS-26, 2879–2894, 1979; and, R. S. Fager, K. V. Peddanarappagari, and G. N. Kumar. "Pixel-based reconstruction (PBR) promising simultaneous techniques for CT reconstructions," IEEE Transactions on Medical Imaging, vol. 12, no. 1, March 1993.

One of the better developed techniques is the algebraic reconstruction technique (ART), introduced by Gordon, et al., which is an iterative procedure for recovering objects from their projections. ART takes a ray at a time and corrects the pixels dynamically as the errors are calculated. But, no averaging is considered. A modification of this method is the simultaneous iterative reconstruction technique (SIRT), proposed by Gilbert in 1972, which has the advantage of reduced noise levels due to averaging but the procedure does not always converge. This divergence was demonstrated by Lakshminarayanan and Lent who proposed a new method called Generalized SIRT (GSIRT), which uses "pseudo-projections" of a fictitious object. In 1971, Gordon and Herman exploited a Monte Carlo method to optimize the image reconstruction and which quantized a digital picture into its picture elements. They demonstrated how to optimize a reconstructed image without disturbing the original projections by adding or subtracting a unit, e.g., quantized, element in each pixel, and also showed the advantage of averaging the signal values for each pixel to enhance the image.

SUMMARY OF THE INVENTION

An object of the present invention is to provide a method for reconstructing three-dimensional images from a limited number of two-dimensional projections.

A further object of the present invention is to provide a method for reconstructing three-dimensional images from two-dimensional projections that reduces the artifacts and image distortion that usually accompany input data obtained from a limited number of such two-dimensional projections.

A still further object of the present invention is to provide a method for reconstructing three-dimensional images from two-dimensional projections that simplifies experimental set-ups and supports non-destructive imaging of microstructures.

Briefly, a three-dimensional image reconstruction method embodiment of the present invention comprises treating the object of interest as a group of elements with a size that is determined by the resolution of the projection data, e.g., as determined by the size of each pixel. One of the projections is used as a reference projection. A fictitious object is arbitrarily defined that is constrained by such reference projection. The method modifies the known structure of the fictitious object by comparing and optimizing its four projections to those of the unknown structure of the real object and continues to iterate until the optimization is limited by the residual sum of background noise. The method is composed of several sub-processes that acquire four projections from the real data and the fictitious object, generate an arbitrary distribution to define the fictitious object, optimize the four projections, generate a new distribution for the fictitious object, and enhance the reconstructed image. The sub-process for the acquisition of the four projections from the input real data is simply the function of acquiring the four projections from the data of the transmitted intensity. The transmitted intensity represents the density distribution, that is, the distribution of absorption coefficients through the object.

An advantage of the present invention is that a power window safety device is provided that is inexpensive and reliable.

Another advantage of the present invention is that a sensor is provided that reverses an automatic closing device when solid obstacles are detected in the closure area.

A further advantage of the present invention is that a timing generator is provided that can detect objects that come into close proximity with glass windows.

BRIEF DESCRIPTION OF THE DRAWINGS

FIG. 4 represents data used by the method of FIG. 1 in the reconstruction of a 13×13 binary object; (a) introduces numerically constructed two-dimensional unknown real and a known arbitrary object, and demonstrates the progress in reconstruction after each loop of the optimization procedure in the first iteration.

DETAILED DESCRIPTION OF THE INVENTION

Figure 1:
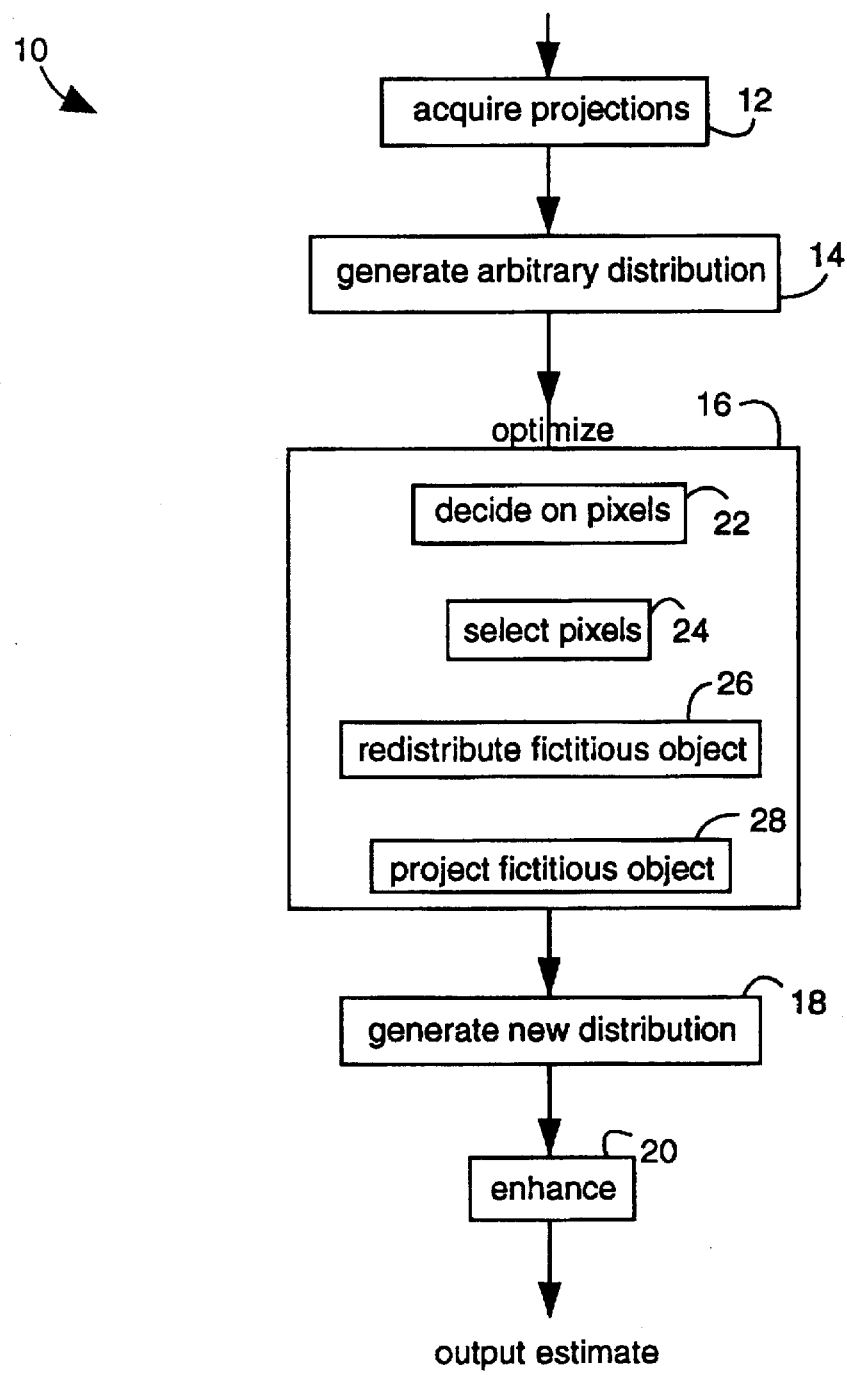
FIG. 1 is a flowchart of a method embodiment of the present invention.

FIG. 1 illustrates an iterative optimizing quantization technique (IOQT) which is a method of the present invention for dealing with a limited number of views, and referred to herein by the general reference numeral 10. The IOQT method 10 includes the optimization of pseudo-projections, as in GSIRT, and the quantization of projections, as in the Monte Carlo method. The IOQT method 10 treats a target object as a group of elements whose size is determined by the resolution of the projection data. The resolution of the projection data is determined, in turn, by the size of the pixels. By using one of the projections as a reference projection, a fictitious object is arbitrarily defined that is constrained by this reference projection. IOQT modifies the known structure of the fictitious object by comparing and optimizing its four projections to those of the unknown structure of the real object and continues to iterate until the optimization is limited by the residual sum of background noise.

The IOQT method 10 comprises a process 12 to acquire a finite number, e.g., four projections from the real data obtained from observations of the target object, a process 14 to generate an arbitrary distribution to define the fictitious object, a process 16 to optimize the four projections, a process 18 to generate a new distribution for the fictitious object, and a process 20 to enhance the reconstructed image. The process 12 is simply a function of acquiring the four projections from the data of the transmitted intensity. The transmitted intensity represents the density distribution, i.e., the distribution of absorption coefficients through the object.

Figure 2:
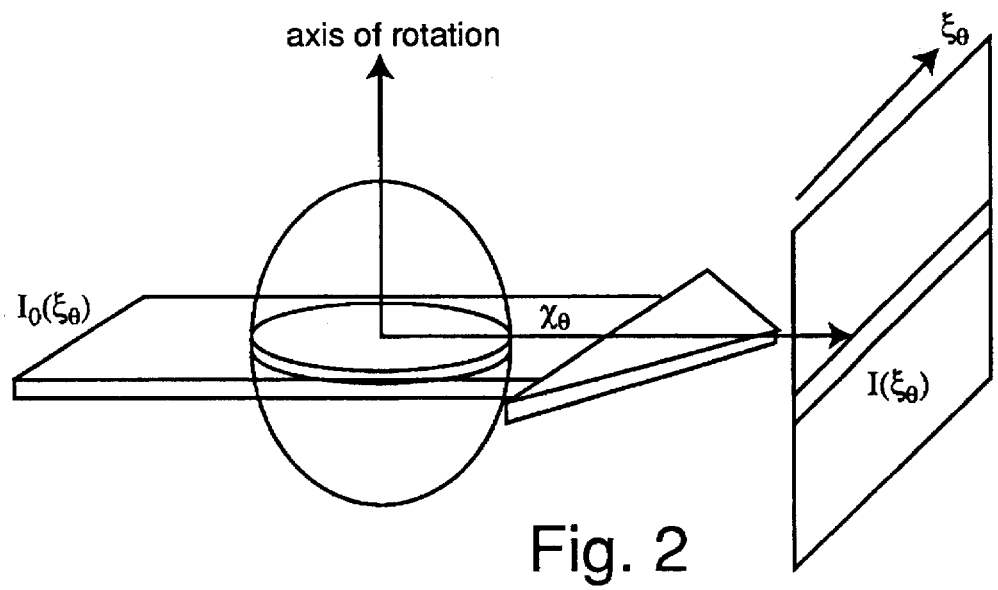
FIG. 2 is a perspective diagram representing the relation between the intensity I and the mass profile P of a three-dimensional object with a two-dimensional projection as related to the method of FIG. 1.

As shown in FIG. 2, the relation between a transmitted intensity, I, and an initial intensity, $I_0$, as a function of the direction of the projection, $\xi_\theta$, and a two-dimensional density distribution function of the object, $f(x_\theta, \xi)$, can be represented mathematically by, $$I(\xi_\theta) = I_0(\xi_\theta) \times e^{-\int f(x_\theta, \xi) dx_\theta} \quad (1)$$

where $\xi_\theta$ is the axis of distribution for the projection in the θ-direction. This can also be written in the form of a mass distribution function in the θ-direction, $p(\xi_\theta)$, as $$p(\xi_\theta) = \int f(x_\theta, \xi_\theta) dx_\theta = \ln\left(\frac{I_0(\xi_\theta)}{I(\xi_\theta)}\right). \quad (2)$$

This mass distribution function is used to generate an initial fictitious object. Since the total mass of each slice should be conserved in each direction especially for an experiment, the mass distribution function is normalized according to, $$_rp_n(\xi_{\theta_1}) = \frac{_rp(\xi_{\theta_1})}{\sum_{\xi_{\theta_1}} {_rp(\xi_{\theta_1})}} ; \ldots ; {_rp_n(\xi_{\theta_4})} = \frac{_rp(\xi_{\theta_4})}{\sum_{\xi_{\theta_4}} {_rp(\xi_{\theta_4})}} ; \quad (3)$$

where $_rp_n(\xi_{\theta^i})$ is the normalized projection data in the direction of $\theta_1$ and for the r-th slice. When using integer arithmetic, the signal intensifies are amplified by multiplying with a uniform constant to minimize the residual error, e.g., $$_rd_0(\xi_{\theta^1}) = m_r f_m \times _rp_n(\xi_{\theta^1}); \ldots ; {_rd_0(\xi_{\theta^4})} = m_r f_m \times _rp_n(\xi_{\theta^4}) \quad (4)$$

where $m_r$ is the total mass of the r-th slice and $f_m$ is a magnification factor.

To generate an arbitrary distribution for the fictitious object, one of the four projections in the direction defined as $\theta_1$ is chosen as a reference projection. The remaining pseudo-projections of the fictitious object are then obtained and their relationship to the projections from the real object are $$d_o(\xi_{\theta^1}) = d_f(\xi_{\theta^1}), \ d_f(\xi_{\theta^2}) \ne d_o(\xi_{\theta^2}), \ d_f(\xi_{\theta^3}) \ne d_o(\xi_{\theta^3}), \text{ and}$$
$$d_f(\xi_{\theta^4}) \ne d_o(\xi_{\theta^4}) \quad (5)$$

where the subscripts, o and f, represent the real object and the fictitious object respectively and the subscript r denoting the r-th slice is eliminated for simplicity.

The optimization process 16 reorganizes the group of fictitious elements by optimizing the projections of the fictitious object to approach that of the real object. The optimization process 16 is simply to add or subtract a unit element in each pixel which is a quantized intensity equal to 1% of the value of the algebraic multiplication factor $f_m$. This procedure includes a subroutine 22 to decide the pixels on which a quantum is added or subtracted, a subroutine 24 to select the pixels by sustaining the chosen constraint, a subroutine 26 to redistribute the fictitious object, and a subroutine 28 to project the fictitious object onto the original view directions. The entire optimization process 16 typically requires looping through these four subroutines several times until reaching a user specified termination criterion.

Some functions for the mathematical interpretation of the first subroutine of the optimization process 16 need defining. In terms of the rotational matrix R(θ), the rotated projection is defined as an operator like, $$P_\theta = P_0 \cdot R(\theta) \quad (6)$$

where $P_0$ is the unrelated projection, that is, $$P_0^j\{f(i,j)\} = \sum_i f(i,j) = d^j(\xi_0) \quad (7)$$

which represents the j-th row projection in the original coordinates. The data is projected in an arbitrary direction θ according to, $$P_\theta\{f(i',j')\} = P_0 \cdot R(\theta)\{f(i,j)\} = P_\theta\{f(i\cos\theta - j\sin\theta + j\sin\theta))\} = d^j(\xi_\theta) \quad (8)$$

where $f(i,j)$ is the two-dimensional density distribution function of the fictitious object in the original (i,j) coordinates. The difference is expressed between the real and the pseudo projections in the direction of $\theta_1$ as, $$\Delta d(\xi_{\theta^1}) = d_o(\xi_{\theta^1}) - d_f(\xi_{\theta^1}) \quad (9)$$

Figure 3:
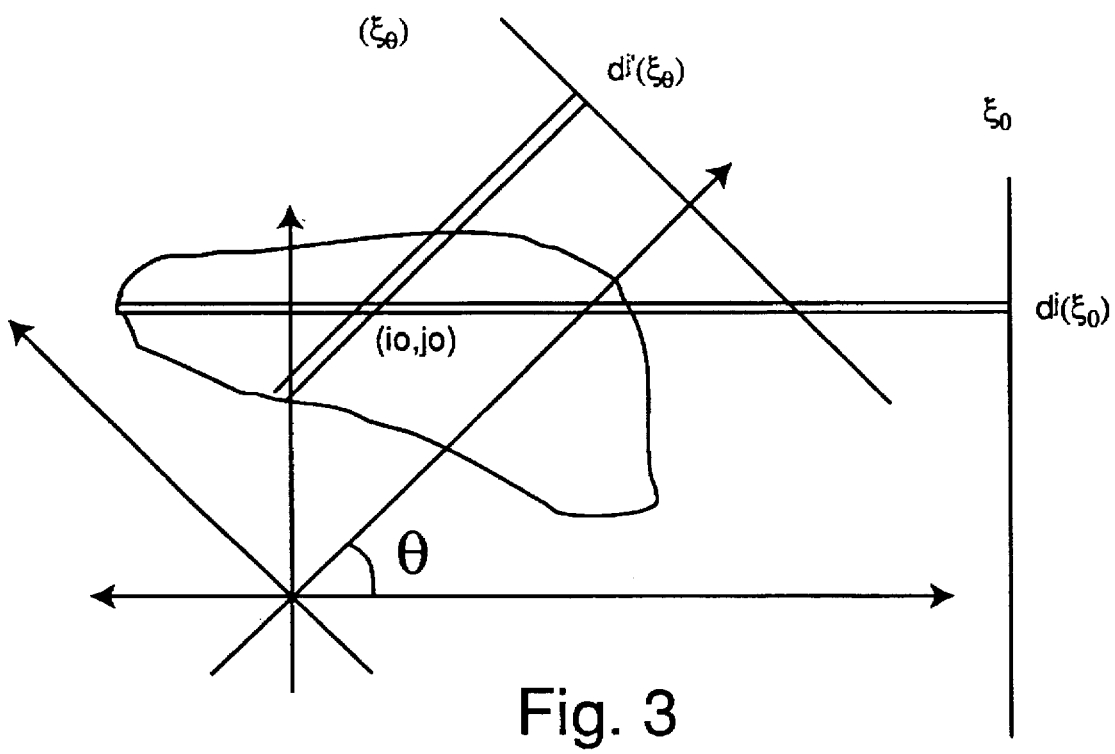
FIG. 3 is a diagram representing the determination of a pixel position with two projection coordinates as related to the method of FIG. 1.

Referring to FIG. 3, since the position of an individual pixel is determined with two projection coordinates, the projection data can be investigated from the four views to assign a probability value to each pixel in the two-dimensional fictitious object. The value of the probability is determined according to the decision process. If $\Delta d'(\xi_{\theta^2}) \leq 0$ and $\Delta d''(\xi_{\theta^2}) \leq 0$, then the $(i_0,j_0)$-pixel, which is determined by projection coordinates, (j,j'), does have a high probability for a unit element $\delta(i_0,j_0)$ to be subtracted. The relation of $(i_0,j_0)$ and (j,j') is deduced as, $$\begin{pmatrix} i_0 \\ j_0 \end{pmatrix} = \frac{1}{(\cos\theta_1 \sin\theta_2 - \cos\theta_2 \sin\theta_1)} \begin{pmatrix} \sin\theta_2 & -\sin\theta_1 \\ -\cos\theta_2 & \cos\theta_1 \end{pmatrix} \begin{pmatrix} j \\ j' \end{pmatrix} \quad (11)$$

from j'=$i_0\cos\theta_1+j_0\sin\theta_1$ and j"=$i_0\cos\theta_2+j_0\sin\theta_2$. In contrast, if $\Delta d'(\xi_{\theta^1}) \geq 0$ and $\Delta d''(\xi_{\theta^2}) \geq 0$, then the $(i_0, j_0)$-pixel does have a high probability for $\delta(i_0,j_0)$ to be added to the function $f(i,j)$. Otherwise the pixels are defined with low probability, which means there is neither an addition nor a subtraction process. After determining the probabilities of all pixels in the two-dimensional object with all combinations of (j,j'), the pixels are selected on which a unit element will be added or subtracted.

The subroutine 24 selects the points for each row which should be added or removed to satisfy the constraints. Due to the constraint $d_f(\xi_{\theta^1})$, the number of $\delta_+(i_0,j=\xi_{\theta^1})$ is equal to that of $\delta_-(i_0, j=\xi_{\theta^1})$ for the j-th row. Therefore, an equal number of $\delta+$ and $\delta-$ will be simultaneously added to or subtracted from $f(i,j)$ during the redistribution in subroutine 26 of the fictitious object plane in the third subroutine. The subroutine 28 projects the redistributed fictitious object onto the original view directions to generate the mass profiles for use in the next optimization loop that will subsequently use different projection combinations. Addition and subtraction of unit elements are also done for the other combination of projections. The number of optimization procedures is generalized with combination, $_nC_m$, where n is the total number of projections minus one for the reference projection and m is a smaller number than n. Here, the number of procedures is three.

The image reconstruction is enhanced in the process 20 before a next iteration or prior to the acquisition of the final result. The main purpose of this process is to accelerate the convergence of the reconstruction. A variety of routines can be applied, e.g., a filtering function, a removing of threshold values to reduce unwanted noise, or a smoothing function like convolution is applied. For the application of the threshold procedure, a threshold value is chosen. Since the mass quanta were enhanced with the magnification factor $f_m$ in order to amplify the signal intensity, each pixel of the image should have at least the value of $f_m$. The pixels which have a lower value than that of $f_m$ are not the ones which contain mass quanta. However, since image reconstruction is never perfect using a limited number of views, a more representative estimate of the threshold value that has been chosen to use in actual simulations is 50% of $f_m$.

Another important function of the enhancement process for simulations is to smooth the estimated image. Since the object is defined to be a group of discrete elements and the point spread function of the zone plate is a Gaussian profile, the reconstruction is smoothed by taking the local average value of neighboring pixels. A convolution routine is used with a two-dimensional Gaussian function. For a next iteration, each row of the reconstruction is equalized to sustain the imposed constraints with the equation, $$F^j(i,j) = \frac{d_0{}^j(\xi_{\theta_1})}{d^j(\xi_{\theta_1})} \times F^j(i,j) \quad (12)$$

where $F^j(i,j)$ and $F^j(i,j)$ are the extracted j-th equalized and non-equalized reconstructions respectively.

To completely solve a linear equation in the n×n unknowns, n×n linear equations are needed, n projection data in n columns. But this is impossible in real experiments. With m projections, m<<n, there will be more than one picture with exactly the same projections. However, the process 16 can select points with high probability to be added or removed by comparing the difference between the real and pseudo projections but not those with low probability. After enhancing the reconstruction after each iteration, the probabilities attached to each element will be affected, e.g., some are increased in probability. At this point, those elements will be selected to be added or removed within the fictitious object plane. The process 16 selects the most probable elements by changing their probabilities without disturbing the reference projection. The optimization process 16 continues for the remaining pseudo-projections up until the reconstruction quality degrades. The IOQT method 10 is then terminated. The standard deviation is applied, e.g., the root mean square, of the projection data, given in equation (13), for the m-th loop to terminate each iteration and also for q-th iteration to terminate. For example, $$_m{}^q\Delta = \left[ \left(\frac{1}{n}\right) \sum_{j=1}^{n} \{d_0{}^j(\xi_{\theta_1}) - {}_m{}^qd^j(\xi_{\theta_1})\}^2 \right]^{1/2} \quad (13)$$

See, W. S. Haddad, I. McNulty, J. E. Trebes, E. H. Anderson, R. A. Levesque, and L. Yang, "Ultrahigh-resolution x-ray tomography," Science, vol. 266, pp. 1213–1215, 1994. According to such termination criterion, if the sequential deviation, $_m{}^q\Delta$, is smaller than the subsequent deviation, $_{m+q}{}^1\Delta$, in the q-th iteration, then the loop of the optimization is stopped to generate the q-th estimated image. If the last deviation in q-th iteration, $^q\Delta$, is smaller than the subsequent deviation, $^{q+1}\Delta$, the execution is terminated and the final reconstruction obtained.

The IOQT method 10 was used for the reconstruction of three simulated objects and one experimental test pattern. The results demonstrated the IOQT method 10 is capable of good three-dimensional reconstruction with only a limited number of views. In a first simulation, a 13×13 binary image was composed of point objects. FIG. 4 represents how an arbitrarily distributed fictitious object can be quickly massaged to approach a real object's distribution during only three loops of the three combinations of the optimizing procedure over a complete iteration. For convenience, the projection angles used in the test case were zero, forty-five, ninety, and 135 degrees. The projections of the real objects are considered to be real experimental projections, and the projections of the fictitious object are considered to be pseudo-projections.

Two other simulations provided a more rigorous test of the performance of the IOQT method 10. More realistic examples were investigated that had arbitrary projections, gray scale objects, and noise problems. For both the test cases, a 50×50 binary image was generated as the real object. In these examples, the finite dimensions of a pixel were taken into account. A value of 100 was used for the magnification factor, $f_m$; a value of fifty was used for the threshold value; and a value of one was used for the standard deviation of the smoothing Gaussian function.

A good agreement was observed between the reconstruction and the real object. The internal structure was revealed, but the choice of projection angles can create a discrepancy in the reconstruction due to the difficult geometries involved. With zero, forty-five, ninety, and 135 degree projections, the reconstruction was good and showed the internal structure. The test object had a symmetry which was projected in evenly separated directions. With zero, fifteen, ninety, and 105 degree projections, artifacts appeared due to the selection of projection angles for an object which was composed of a large number of pixels. The artifacts could be removed by modifying the signal enhancement process.

An improvement was made possible through an improved enhancement procedure that allowed for variations in the threshold value during the image reconstruction for each iteration. In this case, a threshold value of 20% was initially applied for the image reconstruction in the first iteration and then increased by 10% for each subsequent iteration due to the improvement of image perfection. The only difference between the computer simulations was the threshold value that was applied to reduce the residual background. The criterion of equation (13) was used to determine when the IOQT method 10 should be terminated. The simulations demonstrated how the method might be used to select optimum viewing angles. In addition, the optimum signal enhancement technique also appears to depend on the object.

Noise, in the form of random errors like the photon fluctuations produced by unpredictable and unknown sources, is important to consider in simulations. Reference projections that have been contaminated by noise can lead to reconstructions that do not faithfully reproduce the unknown real object. To test the ability of the IOQT method 10 to overcome this problem, a Gaussian random noise distribution was included in each pixel of the simulated projections. The mean value is the noise-free value of each pixel in the simulated projections, and the standard deviation is 10% of the mean value. Two pixels from different projections, representing the position of a point on a two-dimensional object, cannot have the same relative, e.g., corresponding, amount of random noise. As a consequence and after optimization, the noise simply becomes part of the residual background and does not affect the quality of the final image reconstruction. It is assumed, therefore, that the IOQT method 10 is not noise sensitive.

The IOQT method 10 was also tested with a gray scale object in the reconstruction of a real object made of a variety of materials. A gray-scaled object of 50×50 pixels was built of several smaller square blocks each of 5×5 pixels. The individual pixel intensity within a square block ranged from one to seven. All of the pixels in any given square block had the same value. The intensity of adjacent square blocks differed by one unit. The image reconstructions corresponded to the same set of projection angles mentioned earlier. The differences in the shape and size of the distribution of pixel intensities within the reconstructed images of the square blocks reflected the differences in the value of the initial mass, e.g., absorption coefficient, intensities that were used. The higher the initial mass intensity used, the closer the shape and size of the reconstructed image to the original square block. The simulated real projection of the object also included Gaussian random noise.

A real world three-dimensional reconstruction with the IOQT method 10 used the experimental data collected by Haddad, et al., with a scanning x-ray transmission microscope at Brookhaven National Laboratory. One-dimensional projection data was extracted from each projection with angles of zero, fifteen, and ±55 degrees for one of a two-dimensional object plane or slice. In a series of reconstructions, each iteration improved on removing artifacts and reducing the residual background until the real test pattern was approximated.

A critical part of any optimization method is the selection of a convergence criterion. The reconstruction cannot be uniquely determined by a finite number of projections. The criterion for the IOQT method 10 has been found to be consistent with the terminating criterion defined by equation (13). The reconstructed images have all been found to converge into a region with boundaries defined by the intersection of the four views of the real object. Different combinations of primary distributions for the fictitious object and reference projections were used as constraints. The differences between the reconstructed images and actual were indistinguishable. If a reconstructed image did not fall within such boundary, then the reconstructed image did not represent the information obtained by all the limited number of views of the real object. This is exactly the condition that would be required for the standard deviation to be at a minimum.

Figure 5:
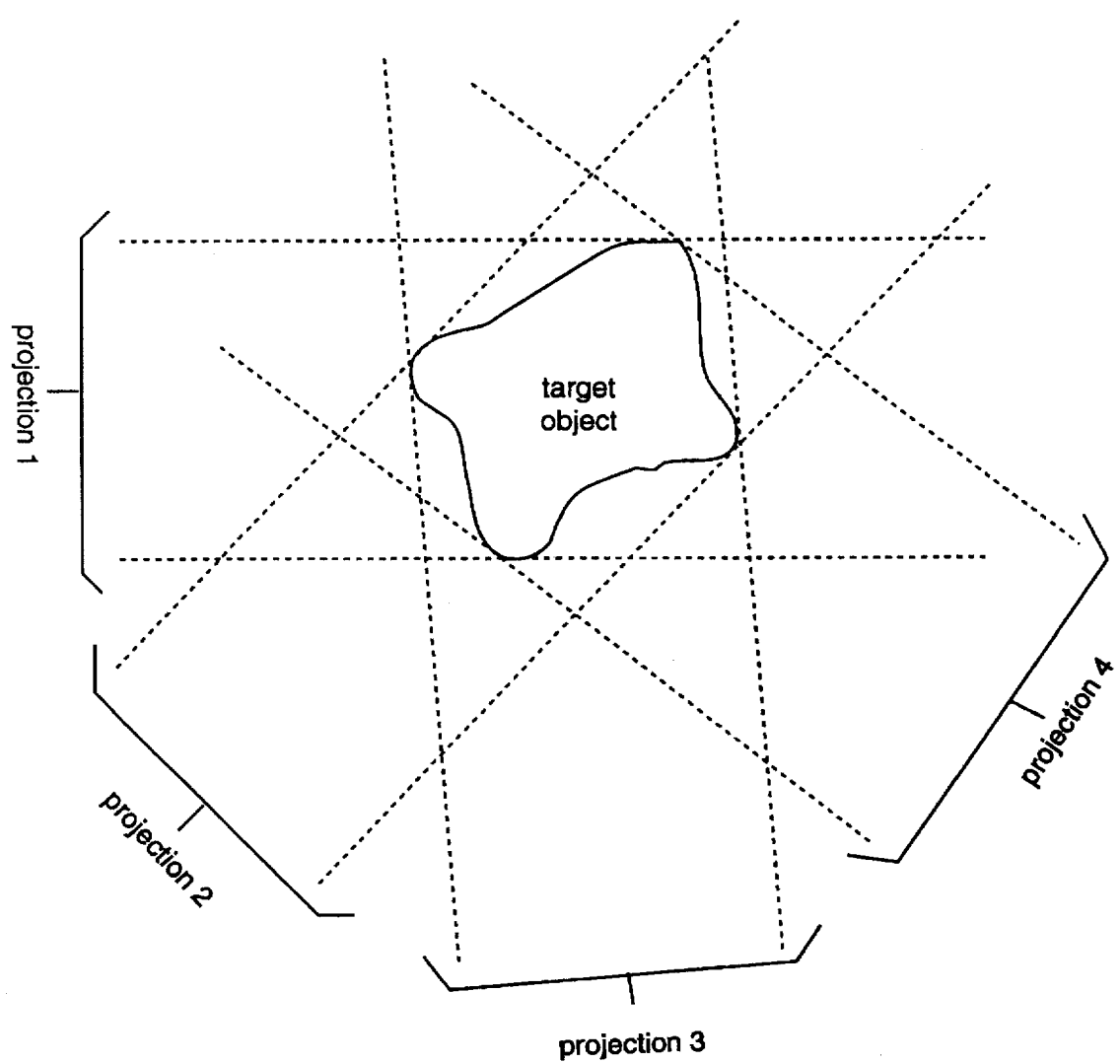
FIG. 5 diagrams a two-dimensional bound region of a primary fictitious object. A reference one-dimensional projection is converged into a region with boundaries that are defined by the intersection of the available views of the real objects. A three-dimensional bound region is similarly reconstructed from two-dimensional projections.

An example for the highly probable region for solution convergence in the case of four views using the IOQT method 10 is illustrated in FIG. 5. In each iteration, the reconstruction with the IOQT method 10 is always convergent. The optimization procedure 16 minimizes the difference, $\Delta d^j = d_0^j - d_r^j$. The estimated image is bounded by a plausible region. However, the sequential ratio for the q-th iteration, $$\frac{\sigma_{q+1}}{\sigma_q},$$

is not always less than one. Since the signal enhancement procedure redistributes the intensity profile of the reconstruction as described by equation (12) in order to facilitate the next iteration, the ratio of standard deviations is greater than one. Then IOQT method 10 is terminated. Averaging the reconstructed images obtained from using different combinations of the primary distribution of the fictitious object and reference projections, terminated using the criterion in equation (13), would lead to even a better image by reducing the overall number of artifacts.

The present invention thus includes a method of reconstructing a three-dimensional image in a volume from a finite number of two-dimensional projections at various limits of the volume. The method comprises collecting a plurality of two-dimensional projections of a three-dimensional object-of-interest in a volume from various points of observation outside the volume: (1) Defining the three-dimensional object-of-interest as a group of elements; (2) selecting any one of the plurality of two-dimensional projections to serve as a reference projection; (3) arbitrarily defining a fictitious three-dimensional strawman in the volume that is constrained by the reference two-dimensional projection; (4) modifying the three-dimensional strawman one at a time to conform to each of the other two-dimensional projections; (5) optimizing by continued iterations through the step of modifying and comparing until further optimization of the three-dimensional strawman is limited by a residual sum of background noise; and (6) outputting a representation of the optimized strawman as an estimate of the three-dimensional character of the object-of-interest in the volume.

The defining of the three-dimensional object-of-interest in the volume as the grouping of elements can be such that each element has a size that depends on the resolution of a particular two-dimensional projection data collected, as is ordinarily determined by the size of corresponding image pixels.

The step of collecting can include the selection of a finite number of projections from an observation data input that is a function of acquiring such projections from transmitted intensity data, wherein the transmitted intensity represents a density distribution of absorption coefficients through the three-dimensional object-of-interest.

Thus another method of reconstructing a three-dimensional image in a volume from a finite number of two-dimensional projections at various limits of the volume comprises acquiring a fixed number of two-dimensional projections from a fictitious object: (1) Generating an arbitrary distribution to define the fictitious object; (2) optimizing the fixed number of projections; (3) generating a new distribution for the fictitious object; and (4) then enhancing the reconstructed image.

Although particular embodiments of the present invention have been described and illustrated, such is not intended to limit the modifications and changes will no doubt become apparent to those skilled in the art, and it is intended that the invention only be limited by the scope of the appended claims.

The invention claimed is:

1. A method of reconstructing a three-dimensional image in a volume from a finite number of two-dimensional projections at various limits of said volume, the method comprising the steps of:

collecting a plurality of two-dimensional projections of a three-dimensional object-of-interest in a volume from various points of observation outside said volume;

defining said three-dimensional object-of-interest as a group of elements;

selecting any one of said plurality of two-dimensional projections to serve as a reference projection;

arbitrarily defining a fictitious three-dimensional strawman in said volume that is constrained by said reference two-dimensional projection;

modifying said three-dimensional strawman one at a time to conform to each of said other two-dimensional projections;

optimizing by continued iterations through the step of modifying and comparing until further optimization of said three-dimensional strawman is limited by a residual sum of background noise; and outputting a representation of said optimized strawman as an estimate of the three-dimensional character of said object-of-interest in said volume.

2. The method of claim 1, wherein:

the defining of said three-dimensional object-of-interest in said volume as said grouping of elements is such that each element has a size that depends on the resolution of a particular two-dimensional projection data collected, as is ordinarily determined by the size of corresponding image pixels.

3. The method of claim 1, wherein:

the step of collecting includes the selection of a finite number of projections from an observation data input and is a function of acquiring such projections from transmitted intensity data, wherein the transmitted intensity represents a density distribution of absorption coefficients through said three-dimensional object-of-interest.

4. A method of reconstructing a three-dimensional image in a volume from a finite number of two-dimensional projections at various limits of said volume, the method comprising the steps of:

acquiring a fixed number of two-dimensional projections from a fictitious object;

generating an arbitrary distribution to define said fictitious object;

optimizing said fixed number of projections;

generating a new distribution for the fictitious object; and enhancing said reconstructed image.

* * * * *